United States Patent [19]

White

[11] 4,442,578
[45] Apr. 17, 1984

[54] METHOD OF MAKING HOT DRAWN LOW FRICTION BEARING

[76] Inventor: Charles S. White, 35815 42nd St., Palmdale, Calif. 93550

[21] Appl. No.: 132,263

[22] Filed: Mar. 20, 1980

[51] Int. Cl.³ .............................................. B21D 53/10
[52] U.S. Cl. ...................... 29/149.5 S; 29/149.5 NM; 29/149.5 DP
[58] Field of Search ................ 29/149.5 S, 149.5 NM, 29/149.5 R, 149.5 DP, 149.5 C

[56] References Cited

U.S. PATENT DOCUMENTS

| | | | |
|---|---|---|---|
| Re. 24,765 | 1/1960 | White | 139/420 |
| 1,904,770 | 4/1933 | Skillman | 29/149.5 NM |
| 3,033,623 | 5/1962 | Thomson | 308/238 |
| 3,037,893 | 6/1962 | White | 154/43 |
| 3,252,346 | 5/1966 | Prior | 74/230.16 |
| 3,455,864 | 7/1969 | Dodson et al. | 260/33.6 |
| 3,464,845 | 9/1969 | Osborn et al. | 117/49 |
| 3,779,918 | 12/1973 | Ikeda et al. | 252/12.6 |
| 3,781,205 | 12/1973 | Cairns et al. | 252/12.6 |
| 3,848,306 | 11/1974 | Morse | 29/149.5 NM |
| 3,879,301 | 4/1975 | Cairns | 252/12 |
| 3,881,791 | 5/1975 | Hentschel | 308/238 |
| 3,908,038 | 12/1974 | Nienart et al. | 427/27 |
| 3,985,661 | 10/1976 | Ikeda et al. | 252/12 |
| 3,994,814 | 11/1976 | Cairns | 252/12.6 |
| 4,137,618 | 2/1979 | Krauss | 29/149.5 NM |

OTHER PUBLICATIONS

"High Temperature Structural Adhesives", *Machine Design*, May 15, 1969, pp. 174-178, Petrie.

*Primary Examiner*—Howard N. Goldberg
*Assistant Examiner*—V. K. Rising
*Attorney, Agent, or Firm*—D. Peter Hochberg

[57] ABSTRACT

A process for making composite bearings with low friction surfaces and metal backings in which the metal backing is used to draw low friction material into the shape of the bearing surface. Heat is used to aid bonding of the low friction material to the backing.

5 Claims, 5 Drawing Figures

U.S. Patent  Apr. 17, 1984  4,442,578
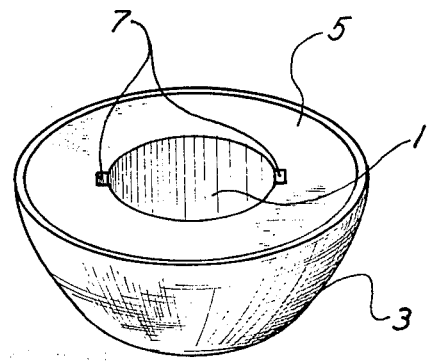
FIG. 1
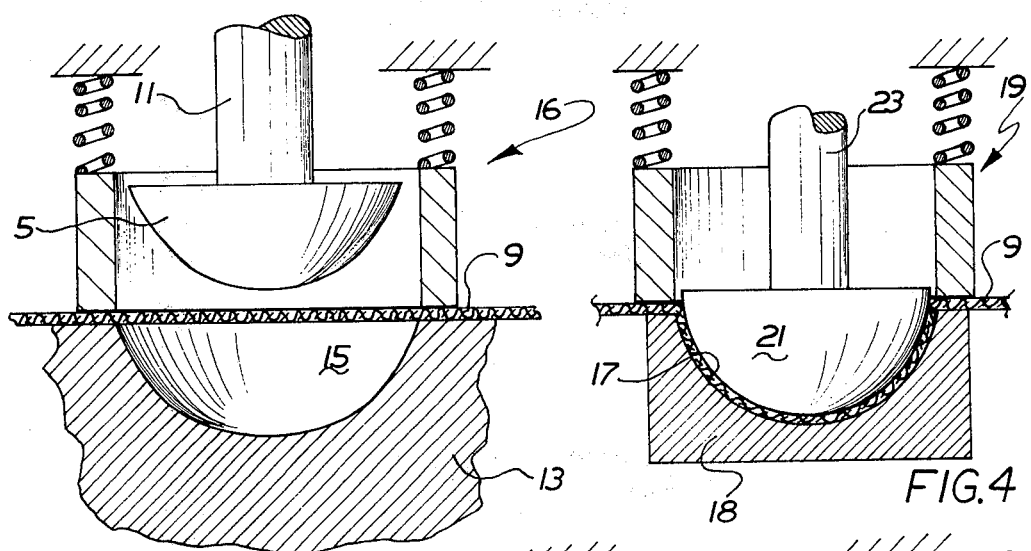
FIG. 2
FIG. 4
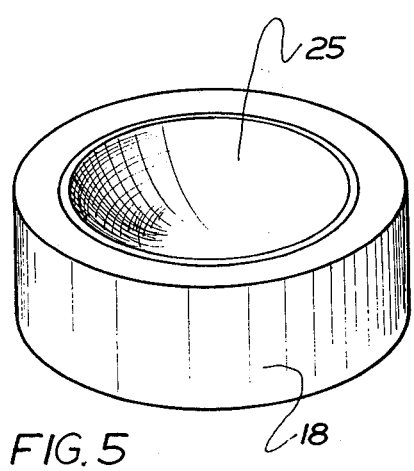
FIG. 5
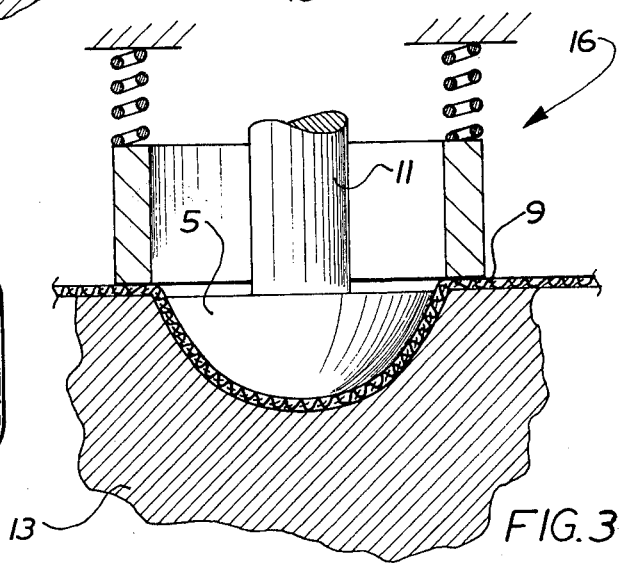
FIG. 3

METHOD OF MAKING HOT DRAWN LOW FRICTION BEARING

BACKGROUND OF THE INVENTION

This invention relates to making bearings with low friction surfaces and metal backing members.

Bearings are well known which comprise rigid support members to which low friction materials defining the bearing surface are attached. Bearing surfaces are often made from various compositions, including thermoplastic resins, especially Teflon (trademark of DuPont for polytetrafluoroethylene). The following U.S. patents teach various plastic bearing compositions.

| Inventor | U.S. Pat. No. |
| --- | --- |
| White | 3,037,893 |
| Dodson & White | 3,455,864 |
| Ikeda & Kawakita | 3,779,918 |
| Cairns & Walton | 3,781,205 |
| Cairns | 3,879,301 |
| Nienart, Sanders & Jeges | 3,908,038 |
| Ikeda & Ishikawa | 3,985,661 |
| Cairns | 3,994,814 |

Bearings with such surfaces often have metal backings to provide strength, rigidity, and shape. A continuing problem has been to find a way to form the bearing and to simply yet satisfactorily fasten the low friction surface material to the metal backing. Such low friction materials have been molded, sintered, glued, sewn, and clipped on to bearing backings. Sometimes low friction material is knit or woven into a fabric and then attached to backing elements. U.S. Pat. No. 3,464,845 to Osborn and Gobran, U.S. Pat. No. 3,037,893 to White and U.S. Pat. No. Re. 24,765 to White are examples of the use of low friction fabric.

A disadvantage of prior art processes for making low friction bearings, other than simple flat bearings, is the frequent need for specialized and complex methods such as molding and sintering for bonding low friction materials to backings and for forming the bearings.

Another disadvantage of the prior art processes for making low friction bearings is that, when relatively simple methods are used, the resulting bearing often has a seam on the bearing face. For example, U.S. Pat. No. 3,848,306, to Morse, discloses a method for making a cylindrical bearing in which a flat layer of plastic and a layer of perforated metal are bonded together to form a single sheet, which is then bent and swaged into a cylindrical tube. The resulting bearing has a seam. Other examples of bearings with seamed surfaces are U.S. Pat. No. 3,881,791 to Hentschel, U.S. Pat. No. 3,252,346 to Prior, and U.S. Pat. No. 3,033,623 to Thomson.

Another shortcoming of the prior art is the time required by the use of separate, sequential steps for bonding low friction material to metal backings and for forming the bearing backings into the final configuration of the bearing.

BRIEF DESCRIPTION OF THE DRAWINGS

FIG. 1 is a perspective view of a bearing made according to the invention.

FIG. 2 is a cross-sectional view of a punching apparatus prior to drawing the bearing according to the invention.

FIG. 3 is a cross-sectional view of a punching apparatus after having drawn the bearing according to the invention.

FIG. 4 is a cross-sectional view of a punching apparatus wherein a die forms part of the workpiece in a process according to the invention, and FIG. 5 is an isometric view of the workpiece.

SUMMARY OF THE INVENTION

It is an object of this invention to provide an improved method for making low friction bearings.

It is also an object of this invention to provide a method for bonding low friction material to a metal backing to make a low friction bearing.

It is another object of this invention to provide a simple and efficient method for making low friction bearings.

It is yet another object of this invention to provide a method for making low friction bearings which utilizes conventional manufacturing apparatus.

It is another object of this invention to provide a method for making low friction bearings without seams.

Other objects will be apparent to those skilled in the art to which the invention pertains from the description to follow and from the appended claims.

The foregoing objects are achieved according to the preferred embodiment of the invention by using a process for making bearings with metal backing members, in which the metal backing is used in the drawing of a sheet of low friction fabric into the desired shape. The fabric can advantageously be provided with a heat responsive bonding material in which case the composite structure is heated to aid in bonding the low friction fabric to the metal backing. The drawing operation can be done on a conventional punch press adapted to use the metal backing members as a forming tool. The bonding can alternatively be accomplished on a conventional punch press provided with a hot die. Since the bearings are formed as an internal unit by drawing, there are no seams on the bearing surface.

DESCRIPTION OF THE PREFERRED EMBODIMENTS

This invention relates to the making of bearings comprising low friction surfaces attached to metal backing members. The use of low friction fabric treated with bonding resins to make bearing surfaces is well known. Such bearings often have metal backing members to give shape, strength, and rigidity to the bearing. By the process disclosed herein bearings are made by using the metal backing member itself as a punch or die used in the drawing of low friction fabric into the desired shape. Preferably, the low friction fabric is treated with resin only on the side which contacts the metal backing, and the fabric is heated to aid bonding of the fabric and metal. The process is such that the bearing can be made on a conventional punch press with only a few modifications. While only one particular bearing configuration is discussed herein, it should be understood that a variety of configurations can be made by the process according to the invention. A related process for making bearings by stamping them from sheets of metal and low friction fabric is disclosed in this inventor's application Ser. No. 132,268 for a Stamped Low Friction Bearing and Process And Apparatus For Making Same. The making of molded bearings from a composite of low friction and bondable material is disclosed in this inventor's application Ser. No. 132,267 for a Low Friction Moldable Bearing and Composition.

The low friction fabric preferably comprises fluorinated hydrocarbons such as fluorinated polyethylene derivatives, for example polytetrafluoroethylene (PTFE), or any other material which has the desirable low friction characteristics, such as polychlorotrifluoroethylene, polyvinylidene fluoride, and the like. Preferably, the low friction material is Teflon (trademark of DuPont for PTFE material). The low friction fabric can be made entirely of low friction material, or it can include bondable materials. By bondable is meant the ability to bond to itself and to other substances. Such bondable materials are useful because of the well known difficulty of bonding Telfon. Bondable materials include Dacron (trademark of DuPont for polyester fiber), cotton, acrylic, methacrylic, nylon, Nomex (trademark for DuPont for polyamide fiber), and the like. Glass fibers are not generally preferred because glass fiber is normally too abrasive. The addition of bondable material adds strength and wear resistance as well as bondability to the fabric, but it does increase friction of the fabric. The preferred mixture of bondable material and low friction material, and even the use of no bondable material, depends on the characteristics desired in the bearing.

The low friction fabric may be either woven or knit. The composition of the low friction fabric may be varied in a number of ways. For example, it may consist of threads of entirely low friction material. Or the low friction fabric may contain a mixture of kinds of threads, each kind of thread consisting of low friction material or bondable material. Or the low friction fabric may have threads that include both low friction material and bondable material. Some or all of the threads of the low friction fabric may be made up of bondable low friction yarn. Such yarn includes both filaments of low friction material and filaments of bondable material. The bondable low friction yarn is made by twisting the various kinds of filaments together into a single thread which, therefore, has both low friction properties and the capability of being bonded together and to the metal backing. Similar advantages can be obtained by braiding together filaments of both low friction material and bondable material to form a bondable low friction braided thread.

In its preferred form, low friction fabric is treated with a bonding resin which allows the fabric to bond to itself, making a more uniform fabric, and also to bond to the metal backing. Bonding resins may be applied to the low friction fabric by immersion, spraying, painting, or the like. In its most preferred form the resin is applied to only one side of the fabric, such as by using rollers to apply the resin. As explained below, having resin on only one side of the fabric facilitates high volume processing.

The resin can be a cured thermosetting resin. Such resins can be urea formaldehyde, urethane, melamine-formaldehyde, and the like. The preferred resin is phenol-formaldehyde. After the fabric is treated with the resin, it is cured to the resin's B-stage; that is, the solvent is driven out and the resin alone remains in an essentially non-tacky yet incompletely cured condition. In other words, in the B-stage the resin is in a solidified yet thermoplastic state with substantially all the solvent removed. A process for impregnating thread or yarn before knitting or weaving is described in U.S. Pat. No. 3,947,611 issued to the present inventor, herein incorporated by reference. However, it is preferable to apply the resin after the fabric is woven, so that the resin may be applied to only one side of the fabric.

A thermoplastic resin may also be employed, provided the temperature at which the resin has a tendency to flow is substantially higher than the operating temperature of the resulting low friction bearing. In the case of this class of resins, if impregnation is carried out with the resin in a solvent solution, the solvent should be removed before use.

If the bearing is to be subjected to high temperature, it may be desirable to employ an appropriate high temperature resin. Such resins are discussed in Machine Design, May 15, 1969 issue, pages 174-178 which is herein incorporated by reference. Such resins or adhesives are epoxies, epoxy phenolic, amideimides, polyimides, polybenzimidazole, polycaroranesiloxane, and the like. A preferred high temperature resin in Pyralin (trademark of DuPont for a polyimide).

The bonding resin, whether a thermosetting or thermoplastic resin, may be characterized as being in a "solidified yet thermoplastic" state; that is, it has the property of softening and fusing when heated, and of hardening again when cooled. This is intended to characterize a thermosetting resin which has been cured, as well as a true thermoplastic resin which may be softened by heating.

The metal backing member can be made by casting, molding, cold forming, or any other method which gives a metal piece in the desired configuration. A preferred method is cold drawing with subsequent heat treatment. Another preferred but more expensive method is sintering. The metal backing member has an outside surface conforming to the desired shape of the low friction surface of the bearing. Typically, the backing member has a hollow interior. The inside configuration depends on the desired application of the bearing. For example, FIG. 1 illustrates a hemispherical bearing with a metal backing member 5 and low friction surface 3. The inner configuration of the bearing and backing member has a cylindrical hole 1 extending through the bearing.

FIGS. 2 and 3 show the drawing of the low friction fabric 9. In FIG. 2, the fabric is run over a die 13 which has an inner face or cavity 15 corresponding to the desired shape of the outer surface of the bearing. A spring loaded hold down ring 16 clamps the fabric around the edge of cavity 15. The metal backing 5 is removably mounted on a punch shaft 11. One means of mounting backing 5 on the punch shaft is by means of mounting pins. FIG. 1 shows notches 7 in the metal backing which receive pins on the punch shaft to support and align the metal backing on the punch shaft. In order to secure the bearing fabric 9 to the backing member 5, the punch 11 with the backing material is urged against the fabric with sufficient force against die 13 to tightly drive the fabric against the backing member. This operation assures the accurate formation of the bearing and the proper adhesion of the fabric against the backing member. FIG. 3 shows the bearing after it is formed by having the metal backing draw the low friction fabric into the die. (The fabric is depicted in an undeformed manner for clarity; in reality it would be pressed against the backing member.)

In the embodiment of FIGS. 1-3, a component 5 of the die punch constitutes part of the final bearing. Alternatively the die can form a part of the bearing. Accordingly, there is illustrated in FIG. 4 apparatus drawing fabric 9 into a die 18 which serves as the metal backing for a concave bearing. Fabric 9 is drawn across a hemispherical cavity 17 of a cylindrical die 18, spring loaded hold down ring assembly 10 clamps the fabric across the cavity, and a die punch 21 is driven by a punch shaft 23 against the fabric to form and adhere the fabric to the concave face of the cavity of die 18. After die punch 21 is removed and hold down ring assembly 19 is raised, and following a fabric trimming step, a fabric bearing composed of die or backing 18 with a fabric bearing surface 25 bonded to the concave face as shown in FIG. 5.

It should be noted that the fabric is substantially unshaped prior to the step of urging the fabric and the metal backing together. By substantially unshaped it is meant that the fabric is not yet in the configuration or shape desired for the final bearing surface, i.e., the fabric is in a generally flattened condition. Preferably, the fabric is flat when fed over the metal backing, although other configurations are possible. In any event, the shaping of the fabric into the desired bearing surface is accomplished as the fabric and the metal surface are urged together to form the bearing.

As the fabric in the foregoing embodiments has been coated with a thermoplastic or thermosetting resin, the low friction fabric is next heated to facilitate bonding. This can be done by using a hot die in the drawing process, or by heating the composite structure as a separate operation. If the "hot die" procedure is employed, die 13 or 18 itself is heated by appropriate electrical elements or the like known in the art to elevate the temperature of the bonding material adjacent the die. Alternatively, the punch 5 or 21 itself could be heated to in turn heat the backing member. As heat is applied, the bonding resin softens, and it coalesces to form a continuous matrix about and through the bondable low friction fabric. In the case of a thermosetting resin, heat and pressure required for final curing cause the resin to first soften and coalesce into a continuous matrix, and as the polymerization proceeds, the resin assumes its normal solidified cross-linked character. In the case of a thermoplastic resin, heat and pressure will effect a softening coalescence of the threads to a continuous matrix, which upon cooling solidifies and effects the bonding of the threads to each other. During this process the bonding resin also bonds the fabric to the metal backing.

The low friction fabric is preferably treated with resin on only one side. This treated side is the side which contacts the metal backing. It is unnecessary to have resin on the other side; indeed, when a great many bearings are being made there is a tendency for resin to build up in the dies if resin is put on both sides of the fabric. The presence of resin on the bearing side of the fabric can increase the coefficient of friction of the bearing, wherefore it should be avoided.

Final finishing of the bearing may include trimming or wiping of the bearing to remove excess material, additional heat treatment, and the like.

The preferred embodiments as described herein fulfill the objects of the invention. A low friction bearing with a metal backing is made by using the metal backing member as a punch or die in the drawing of low friction fabric into the desired shape of the bearing surface and heating it to aid bonding. The operations can be carried out on conventional equipment adapted to the invention. The resulting bearing has a low friction surface without seams.

The invention has been described with particular reference to the preferred embodiments, but it will be understood that variations and modifications within the spirit and scope of the invention may occur to those skilled in the art to which the invention pertains.

What I claim is:

1. A process for making a low friction bearing having a metal backing and a nonflat fabric bearing surface, said process comprising the steps of:
   placing in overlapping relationship a low friction fabric having a generally flattened condition and a metal backing having a nonflat surface;
   using the metal backing as a punch or die and urging said nonflat surface of said metal backing and said low friction fabric together with sufficient force to adhere said fabric to said backing across their mutually engaged surfaces and to form said fabric into a nonflat low friction bearing surface.

2. The invention of claim 1, wherein said nonflat surface of said metal backing is convex and said urging step comprises using said backing as a punch to draw said low friction fabric into the shape of the bearing.

3. The invention of claim 1, wherein said nonflat surface of said metal backing is concave and said urging step comprises using said backing as a die and urging a punch against said fabric to draw said fabric against said concave backing.

4. The invention of claims 1, 2 or 3, wherein said substantially unshaped low friction fabric is in the form of a flat sheet immediately prior to said urging step.

5. The invention of claims 1, 2 or 3 wherein the fabric includes a thermoset or thermoplastic bonding resin, and said step forming the low friction bearing further comprises heating said low friction fabric sufficiently to soften and fuse the resin.

* * * * *